United States Patent
Sakashita et al.

(10) Patent No.: US 7,346,451 B2
(45) Date of Patent: Mar. 18, 2008

(54) ELECTRONIC DEVICE AND PROGRAM FOR DISPLAYING MAP

(75) Inventors: Naohiro Sakashita, Obu (JP); Masatoshi Abo, Toyota (JP)

(73) Assignee: DENSO CORPORATION, Kariya (JP)

( * ) Notice: Subject to any disclaimer, the term of this patent is extended or adjusted under 35 U.S.C. 154(b) by 80 days.

(21) Appl. No.: 11/001,041

(22) Filed: Dec. 2, 2004

(65) Prior Publication Data
US 2005/0125145 A1   Jun. 9, 2005

(30) Foreign Application Priority Data
Dec. 3, 2003   (JP)   ............... 2003-404898

(51) Int. Cl.
  *G01C 21/30*   (2006.01)
(52) U.S. Cl. ............... 701/208; 340/990; 345/698; 345/995.1
(58) Field of Classification Search ........ 701/207–211; 345/418, 698, 995.1; 455/404.2, 456.1, 456.2, 455/95; 358/302; 340/990; G08G 1/123
See application file for complete search history.

(56) References Cited

U.S. PATENT DOCUMENTS

| | | | | |
|---|---|---|---|---|
| 3,249,326 A | * | 5/1966 | Reister | 244/175 |
| 5,517,419 A | * | 5/1996 | Lanckton et al. | 701/216 |
| 5,995,895 A | * | 11/1999 | Watt et al. | 701/50 |
| 5,999,650 A | * | 12/1999 | Ligon | 382/191 |
| 6,198,989 B1 | * | 3/2001 | Tankhilevich et al. | 701/2 |
| 6,202,022 B1 | * | 3/2001 | Ando | 701/200 |
| 6,285,924 B1 | * | 9/2001 | Okamoto et al. | 701/1 |
| 6,337,683 B1 | * | 1/2002 | Gilbert et al. | 345/418 |
| 6,339,745 B1 | * | 1/2002 | Novik | 701/208 |
| 6,341,255 B1 | * | 1/2002 | Lapidot | 701/209 |
| 6,427,114 B1 | * | 7/2002 | Olsson | 701/117 |
| 6,456,299 B1 | * | 9/2002 | Trombley | 345/629 |
| 6,470,265 B1 | * | 10/2002 | Tanaka | 701/208 |
| 6,621,423 B1 | * | 9/2003 | Cooper et al. | 340/995.24 |

(Continued)

FOREIGN PATENT DOCUMENTS

JP   A-H01-163608   6/1989

(Continued)

OTHER PUBLICATIONS

Derwent-Acc-No. 2001-322479, Mar. 30, 2001, Vehicle mounted navigation apparatus for passenger guidance, performs vocal guide to passenger, when vehicle line is not suitable.*

(Continued)

*Primary Examiner*—Cuong Nguyen
(74) *Attorney, Agent, or Firm*—Posz Law Group, PLC

(57) ABSTRACT

When a guiding route is included in a display target region at a photograph display mode, route data of the guiding route is also read. Within the read route data, information of a region for editing a photograph is stored. This information includes a road kind (color information), coordinates of the start/end points of the road, and a road width when editing is for a road. Next, photograph data is read, so that a color of the photograph data is edited based on the stored information of the route data. For instance, a color of the photograph data in a corresponding road region is changed to red that represents "national road."

13 Claims, 3 Drawing Sheets

U.S. PATENT DOCUMENTS

| | | |
|---|---|---|
| 6,725,154 B2 | 4/2004 | Kamikawa et al. |
| 6,748,323 B2* | 6/2004 | Lokshin et al. ............. 701/213 |
| 6,803,905 B1* | 10/2004 | Capps et al. ................ 345/173 |
| 6,853,905 B2* | 2/2005 | Barton ....................... 701/200 |
| 6,862,520 B2* | 3/2005 | Kamiya et al. ............. 701/200 |
| 2003/0078724 A1* | 4/2003 | Kamikawa et al. ......... 701/208 |
| 2003/0117658 A1* | 6/2003 | Takenaga .................... 358/302 |
| 2003/0225513 A1* | 12/2003 | Gagvani et al. ............ 701/211 |
| 2003/0229478 A1* | 12/2003 | Rappaport et al. ............ 703/13 |
| 2003/0236618 A1 | 12/2003 | Kamikawa et al. |
| 2004/0029558 A1* | 2/2004 | Liu ........................ 455/404.2 |
| 2004/0034464 A1* | 2/2004 | Yoshikawa et al. ......... 701/117 |
| 2004/0066316 A1* | 4/2004 | Ogawa .................... 340/995.1 |
| 2004/0243307 A1* | 12/2004 | Geelen ....................... 701/213 |
| 2005/0107952 A1* | 5/2005 | Hoshino et al. ............ 701/211 |
| 2005/0125145 A1* | 6/2005 | Sakashita et al. ........... 701/208 |

FOREIGN PATENT DOCUMENTS

| | | |
|---|---|---|
| JP | A-H07-28400 | 1/1995 |
| JP | A-2000-283784 | 10/2000 |

OTHER PUBLICATIONS

Unknown, Explore Google Local, from http://www.google.com/help/maps/tour (5 pages printed out on Feb. 8, 2006).*

Unknown, Choose your data—ImageAtlas, Mix and match any layers, from GlobeXplorer (Airphotousa.com)—8pages, printed on Feb. 8, 2006.*

* cited by examiner

ELECTRONIC DEVICE AND PROGRAM FOR DISPLAYING MAP

CROSS REFERENCE TO RELATED APPLICATIONS

This application is based on and incorporates herein by reference Japanese Patent Application No. 2003-404898 filed on Dec. 3, 2003.

FIELD OF THE INVENTION

The present invention relates to an electronic device, e.g., a navigation device, for displaying a map on a display unit based on map data.

BACKGROUND OF THE INVENTION

There is a navigation device for displaying a map on a display unit based on map data. Further, a technology is known that displays with photograph data combined (refer to Patent Document 1), having an object to give reality to a map display of a traveling route obtained from route retrieving. When a wide area map is displayed, the traveling route is shown while superimposed on satellite photograph data. This enables a user to grasp, with a short period, road environments along the traveling route such as a mountain road, a road along a coast, or a town road.

Patent Document 1: JP-2000-283784 A

However, a user for a navigation device seldom travels in practice using such a wide area map of a wide area reduction scale. It is sufficient in using of map data only to know which of a mountain road, a road along a coast, or a town road the traveling route is without daring to use the photograph data. Thus, the technology described in Patent Document 1 has room for improvement in practical effectiveness since it is limited to a specific reduction scale map or a wider area map. Further, even when it is not limited to a display at the wide area reduction scale map, the relevant display lacks an overall fineness because of adopting a displaying procedure superimposing a traveling route on the photograph data. Further, the above problems arise even in other electronic devices having a displaying function, without limiting to the navigation device.

SUMMARY OF THE INVENTION

It is an object of the present invention to provide an electronic device having a displaying function that is capable of properly displaying a map using photograph data.

To achieve the above object, as a first aspect of the present invention, an electronic device for displaying a map is provided with the following. A map data storing unit stores map data. A photograph data storing unit stores photograph data photographing an earth surface. A display controlling unit causes a display unit to display photograph data of a display target region based on the photograph data read from the photograph data storing unit. A changing portion determining unit determines, within the photograph data of the display target region, a data portion whose display attribute is to be changed based on one of the map data stored in the map data storing unit and guiding route data obtained by using the map data stored in the map data storing unit. Here, the display controlling unit causes the display unit to display the photograph data after the display controlling unit changes, to a given attribute, the display attribute of the data portion determined by the changing portion determining unit.

In this first aspect of the present invention, the data portion whose display attribute is changed can include a road unit, or a site unit. This site unit means other than roads. Naturally, the data portion can be determined based on a road kind or a site kind. For instance, the road kind includes an expressway, a national road, or a prefectural road, while the site kind includes a railway line, a river, or an establishment. Further, the changed display attribute can include a display color.

Thus, only changing of a display attribute corresponding to a road obtained from map data suffices for highlighting on a display a display color corresponding to the road within a photograph. This does not superimpose a line on the photograph data likewise a conventional procedure, not hiding images on the photograph. This thereby enables a fine display without decreasing reality of the photograph. When the display attribute of the road is changed, the whole of the colors of the roads can be changed. However, for instance, only a guiding route (a route to a destination) obtained from route retrieving can be changed in its display attribute. Further, a road or a color as a target of changing can be selected as needed by using road kinds. That is, a national road is changed to red; an expressway, to blue; others are not changed. This provides an easy viewable map display without becoming unsightly. In particular, when the guiding route is highlighted, only the guiding route can be effectively changed using a clearly recognizable color, while the others are not changed.

In a second aspect of the present invention, an electronic device for displaying a map is provided with the following. A photograph data storing unit stores photograph data whose display attribute is changed by being determined based on map data. The map data corresponds to a data portion whose display attribute is changed. The photograph data is formed by photographing an earth surface. A display control unit causes a display unit to display a display target region based on the photograph data read from the photograph data storing unit.

In the foregoing first aspect, photograph data and map data are separately stored, thereby determining in real time a portion for changing a display attribute within photograph data. This is very effective, e.g., when a guiding route is highlighted. Further, this is also effective when a user changes a target for changing its display attribute based on an occasional usage. Here, it is preferable that a user can select a display attribute within constituting elements or positions on map data. When instructions are inputted by the user, the photograph data can be thereby changed in display attributes according to the inputted instructions.

By contrast, in the second aspect, for instance, by identifying road kinds, a national road is changed to in red; an expressway, to in blue; further, others are not changed in color. Here, there is no need for performing in real time, so that photograph data whose display attribute is previously changed can be stored to be then displayed.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS (Navigation Device 1)

Figure 1:
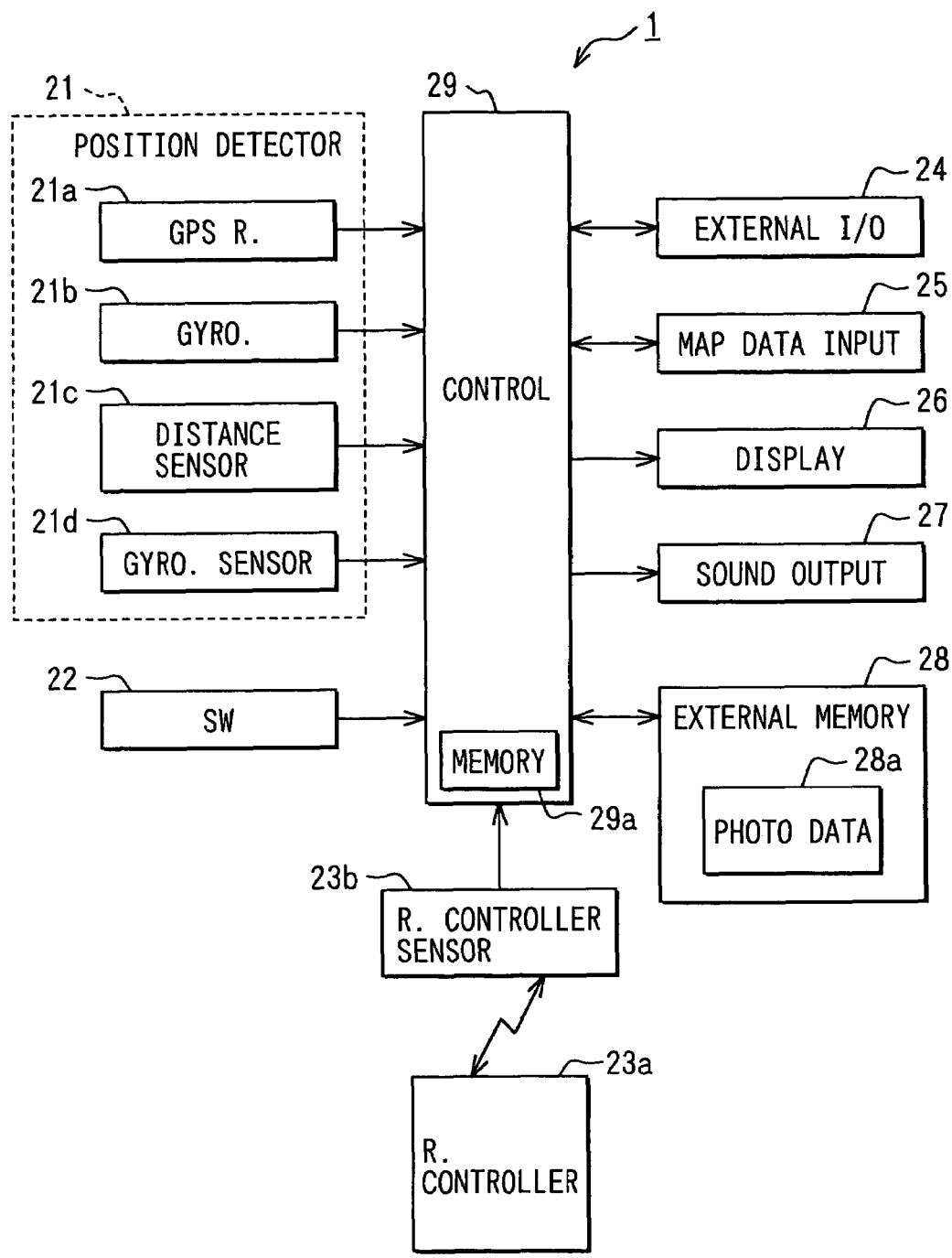
FIG. 1 is a block diagram showing an overall structure of a navigation device according to an embodiment of the present invention.

The present invention is directed to a navigation device of an electronic device as an embodiment. As shown in FIG. 1, the navigation device 1 includes: a position detector 21 for detecting a current position of a vehicle; an operating switch group 22 for a user to input; a remote controller 23a for inputting various instructions similarly with the operating switch group 22; a remote controller sensor 23b for inputting signal from the remote controller 23a; an external information input and output device 24; a map data input unit 25 for inputting map data or the like from an external storage medium storing various information such as map data; a display device 26 for displaying a map display window, a TV window, or the like; a sound output device 27 for outputting various guiding sound or the like; an external memory 28 for storing various data; and a control circuit 29. Here, the control circuit 29 executes various processes based on the inputs from the position detector 21, the operating switch group 22, the remote controller 23a, the external information input and output device 24, the map data input unit 25, and the external memory 28. Further, the control circuit 29 controls the position detector 21, the operating switch group 22, the remote controller sensor 23b, the external information input and output device 24, the map data input unit 25, the display device 26, the sound output device 27, and the external memory 28.

The position detector 21 receives transmission radio waves from GPS (Global Positioning System) satellites via a GPS antenna. The position detector 21 includes: a GPS receiver 21a for detecting, a vehicle current position, an orientation, a speed, etc.; a gyroscope 21b for detecting a rotation force applied to the vehicle; a distance sensor 21c for detecting a traveling distance from a vehicle longitudinal acceleration or the like; and a geomagnetism sensor 21d for detecting an advancing orientation from geomagnetism. These components 21a to 21d have respectively differently featured errors, so that they are constructed while being supplemented by one another. Further, depending on accuracy, only part of the foregoing components can be adopted. Furthermore, the position detector 21 can adopt another component such as a sensor for steering rotation, a wheel sensor for a following wheel, or the like.

The operating switch group 22 that are integrated with the display device 26 includes a touch panel provided on a screen or mechanical key switches surrounding the display device 26. The touch panel and the display device 26 are integrated by being laminated. The touch panel adopts a pressure-sensitive type, an electromagnetic inductive type, an electrostatic capacitance type, or any combination of the foregoing types.

The external information input and output device 24 receives FM broadcasting signals via a radio antenna (not shown), radio wave beacon signals and optical beacon signals from base stations for VICS (Vehicle Information and Communication System) service disposed along roads. The received information is sent to the control circuit 29 and processed. The external information input and output device 24 is communicated with a cell phone (not shown) to retrieve information from an information center (not shown); further, it is communicated with the Internet to receive information from servers in the Internet.

The map data input unit 25 inputs various data such as road data as network data, map data for map matching used to enhance accuracy in designating a position, mark data indicating establishments, image or sound data for guiding. These data can be stored in a storage medium such as a CD-ROM, a DVD, a hard disk, a memory, or a memory card.

The external memory 28 is constructed of, e.g., a hard disk, storing photograph data 28a or the like. The photograph data 28a includes photograph data photographing earth surfaces from up in the sky, such as aerial photographs or satellite photographs.

The display device 26 is a color display device, including a liquid crystal display, a plasma display, and a CRT. The display screen of the display device 26 displays photograph data 28a read from the external memory 28, a mark indicating a current position, and additional data, with the foregoing data superimposed on one another. Here, the current position is designated from a vehicle current position detected by the position detector 21 and map data inputted from the map data input unit 25. The additional data includes a guiding route to a destination, names, landmarks, and marks for establishments. Further, guidance for the establishments is also displayed.

The sound output device 27 outputs sounds for various guidance including those for establishments inputted from the map data input unit 25 or sounds for reading information obtained via the external information input and output device 24.

The control circuit 29 is mainly constructed of a known micro-computer including a CPU, a ROM, a RAM, an I/O, and a bus line connecting the foregoing components. The control circuit 29 computes a vehicle current position as a pair of coordinates and an advancing orientation based on the detection signals from the position detector 21, based on a program stored in the ROM or the like. The control circuit 29 executes a map display process to display information in the display device 26, using a map or photograph data 28a of a region surrounding a current position read via the map data input unit 25, or using a map or photograph data 28a of a region designated by operation of the operating switch group 28 or the remote controller 23a. The control circuit 29 further executes a route guiding process. Here, an establishment to become a destination is designated according to operation of the operation switch group 22 or the remote controller 23a based on position data stored in the map data input unit 25; then, the most appropriate route is automatically obtained from the current position to the destination so as to execute the route guidance. This automatic designation of the most appropriate route uses the Dijkstra method.

(Map Data)

Figure 2:
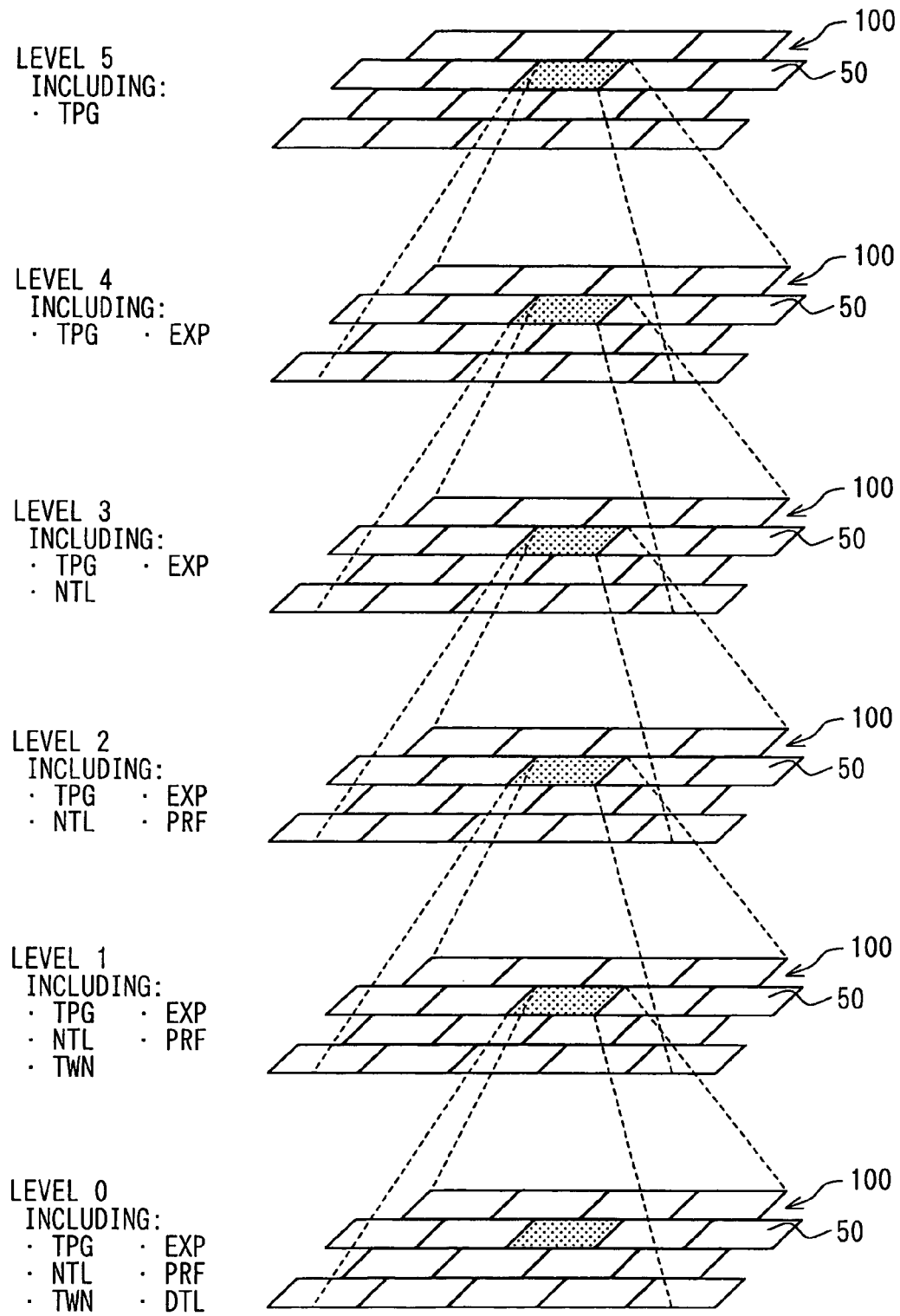
FIG. 2 is a view explaining a hierarchical structure of map data.

Next, a hierarchical structure of the map data will be explained below with reference to FIG. 2. The map data 100 is generated with respect to each of detail degrees of levels 5 to 0 and stored. The map data 100 of the level 5 includes the region map data 50 widest (or largest) among those of the entire levels 5 to 0, storing topography data. The map data 100 of the level 4 includes the region map data 50 wide next to that of the level 5, storing expressway data in addition to the topography data. The map data 100 of the level 3 includes the region map data 50 wide next to that of the level 4, storing national road data in addition to the topography data and the expressway data. The map data 100 of the level 2 includes the region map data 50 wide next to that of the level 3, storing prefectural road data in addition to the topography data, the expressway data, and the national road data. The map data 100 of the level 1 includes the region map data 50 wide next to that of the level 2, storing town road data in addition to the topography data, the expressway data, the national road data, and the prefectural road data. The map data 100 of the level 0 includes the region map data 50 wide next to that of the level 1, storing detail road data in addition to the topography data, the expressway data, the national road data, the prefectural road data, and the town road data. Therefore, the map data 100 of the level 5 includes the widest area data, while that of the level 0 includes the most detailed data.

The road data within the map data is formed of connecting multiple nodes such as intersections with links. Each of the links includes link information of a unique number (link ID) for designate the link, a link length indicating a length of the link, coordinates (coordinates of x, y) of a start point and an end point, a road width of the link, a road kind of the link (indicating road information such as an expressway), a road ID for designating a road. Further, within the map data, area name information, traffic information, establishment information are stored with the corresponding coordinates (coordinates of x, y). The topography data is formed of, e.g., image data. In this embodiment, the photograph data 28a stored in the external memory 28 is not classified into multiple levels, so that a given data piece 1 of the photograph data 28a corresponds to only a given area 1. Further, a photograph image is enlarged or reduced based on a desired map reduction scale.

(Map Data Display Process)

As described above, the control circuit 29 executes processes such as a map display and route computing and guiding using the map data read via the map data input unit 25 and the photograph data read from the external memory 28.

Map Display Process 1

Figure 3:
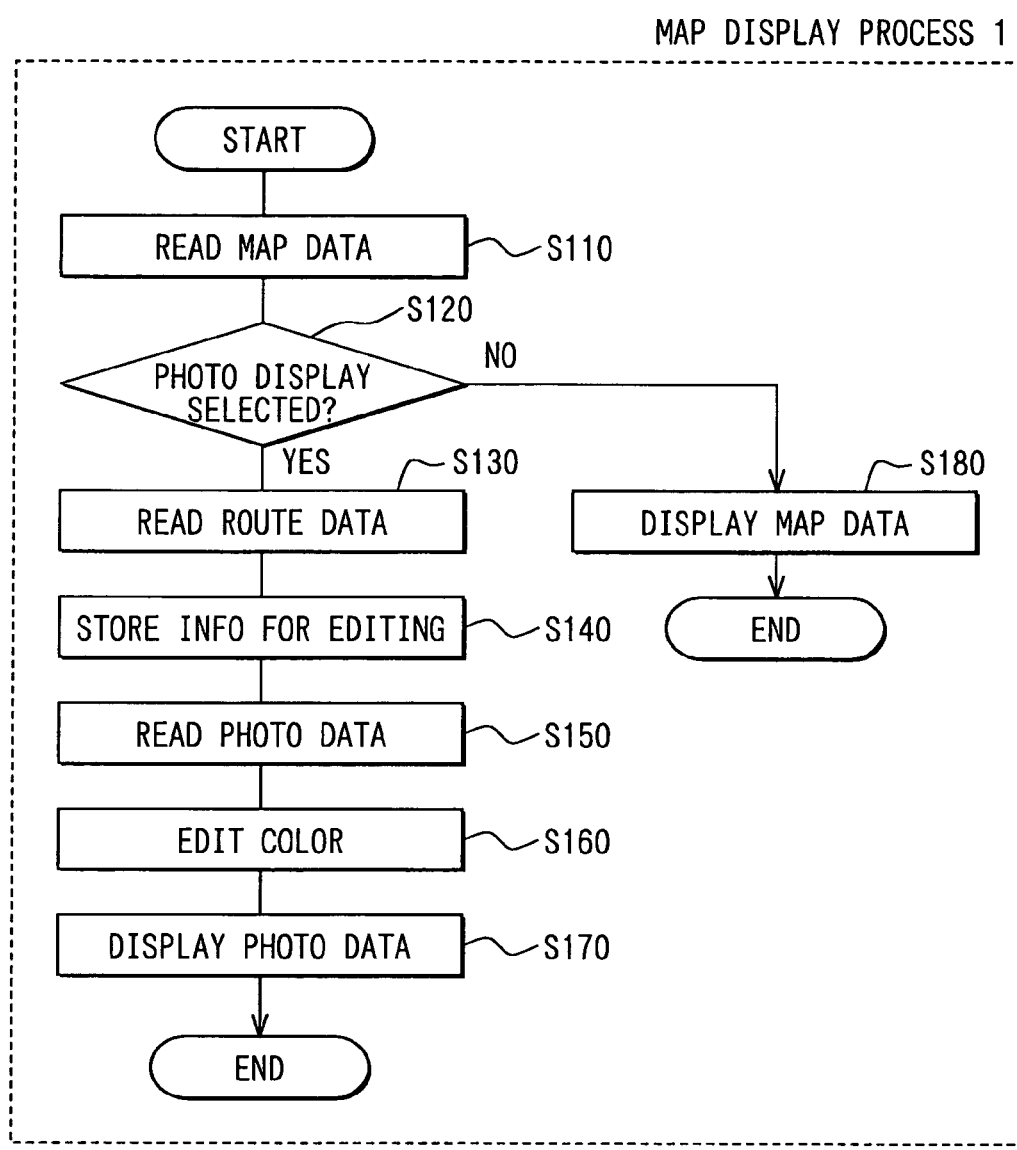
FIG. 3 is a flow chart diagram explaining a map display process 1.

The map display process 1 will be explained with reference to a flow chart of FIG. 3.

First, map data of a region used for a map display is read into a memory 29a from a storage medium via the map data input unit 25 (S110). Here, a photograph display mode is possibly selected in a case where the map is previously displayed using the map data. In this case, reading the map data at Step S110 and displaying the map data at Step S180 are already executed, so that reading the map data at S110 is not executed in practice.

Then, it is determined whether the photograph display mode is selected (S120). Switching to the photograph display mode is instructed by user's operating of the operating switch group 22 or the remote controller 23a. When the photograph display mode is determined to be not selected (S120: NO), "map data used for a map display" read at Step S110 is used for displaying a map (S180). This is a conventional procedure.

By contrast, when the photograph display mode is determined to be selected (S120: YES), a guiding route (traveling route) obtained by the route retrieving is additionally read in the memory 29a if the guiding route is included in the display target region (S130).

Within the read map data, information of a region for editing a photograph is stored (or memorized) (S140). Here, this information will be explained below. For instance, when a road is edited, the information of a region includes a road kind (color information), a road starting/ending coordinates, and a road width. When a site is edited, the information includes a site kind (color information), a site end point, etc.

Next, the photograph data is read in the memory 29a from the external memory 28 (S150). Here, editing of the photograph data follows the information stored at Step S140 (S160). For instance, when a national road is displayed in red, a national road (road kind), color information (red), x, y coordinates (longitudes and latitudes) of respective ends of the national road, and a road width are stored. A color of the photograph data of the corresponding region is change to red according to the information. In detail, since the map of the same region is read in, position information (e.g., longitude and latitude) of a map constituent element of an editing target in the map data is obtained and then the corresponding dot portion within the photograph data is changed in color. Here, an editing target can be only a color, but also, a thickness or kind of a line can be changed, instead. To maintain a reality image, editing of the color is preferable.

The photograph data that is edited is displayed in the display device 26 (S170). Here, when a mark indicating a current position is needed, the mark is displayed. The current position mark is not produced by editing the photograph data, but a display layer of the current position mark is only superimposed at a portion corresponding to the current position on a display layer of the photograph data.

As explained above, only one photograph data is present to one area, while the map data is classified into 5 levels. Therefore, data as roads is different between the wide area map and the detail map. By contrast, since the photograph data is formed by photographing actual earth surfaces, any detail roads are photographed even though the resolution of the images of the detail roads is not maintained at a given level. When the detail map is displayed by enlarging the photograph data, the detail roads are possibly unclearly recognized. By contrast, the detail map data includes information designating a position of the road. Therefore, when the corresponding dot portion within the photograph data is changed in color or the like based on the designating information, the presence of the road can be clearly recognized.

(Effects of Embodiment)

(1) According to the map display process 1 explained with reference to FIG. 3, when a display color of a road portion within a photograph is highlighted, only a display attribute of a portion corresponding to the road portion obtained from map data is changed. This does not superimpose a line on the photograph data likewise a conventional procedure, while this does not hide images on the photograph. This thereby enables a fine display without decreasing reality of the photograph. When the display attribute of the road is changed, the whole of the colors of the relevant roads can be changed. However, for instance, only a guiding route (a route to a destination) obtained from route retrieving can be changed in its display attribute. Further, a road or a color as a target of changing can be selected as needed by using road kinds. That is, a national road is changed to red; an expressway, to blue; others are not changed. This provides an easy viewable map display without becoming unsightly. In particular, when the guiding route is highlighted, it is very effective for only the guiding route to be changed using a clearly recognizable color while the other are not changed.

Furthermore, when the display attribute is a display color, in addition to changing the display color itself, color tones (or hues) in the corresponding dots can be also adjusted so that the map data can be superimposed on the photo data with a natural display enabled, in comparison with changing of the display color alone. Namely, the photo data primarily has hues, while the map data has uniform display colors. Therefore, simple superimposition of the map data (i.e., display color) on the photo data often produces mismatching with the background of the photo data. Consequently, the changed display color is additionally adjusted based on the original color tones of the photo data. This achieves a natural display color in the superimposition of the map data on the photo data.

(Other Embodiments)

(1) In the above embodiment, the map data is stored in a DVD-ROM, or a CD-ROM, so that the map data is read via the map data input unit 25 while the photograph data 28*a* is stored in the external memory 28. However, both of the map data and the photograph data can be stored in the DVD-ROM, or the CD-ROM. Otherwise, the both of the map data and the photograph data can be stored in the external memory 28. Here, the both of the map data and the photograph data are obtained from the outside (e.g., information distribution center) via a communications by the navigation device 1 and is stored in the external memory 28.

(2) In the above map display process 1, editing processing such as changing a color of the road or the like in displaying the photograph data is executed in a real time basis. Namely, in the map display process 1, photograph data and map data are separately stored, thereby determining in real time a portion for changing a display attribute within photograph data. This is very effective, e.g., when a guiding route is highlighted. Further, this is also effective when a user changes a target for changing its display attribute based on an occasional usage. Here, it is preferable that a user can select a display attribute within constituting elements or positions on map data. When instructions are inputted by the user, the photograph data can be thereby changed in display attributes according to the inputted instructions.

By contrast, in the modified map display process, for instance, by identifying road kinds, a national road is changed to in red; an expressway, to in blue; further, others are not changed in color. Here, there is no need for performing in a real time basis, so that photograph data whose display attribute is previously changed can be stored to be thereafter displayed. Namely, when the photograph data is stored in the storage such as a DVD-ROM, a CD-ROM, or an HDD, the editing processing similar to that in the map display process 1 is executed and the edited photograph data can be stored in the storage. Further, the adjusted color tones described in the above can be also stored as part of edited photograph data. However, this modification cannot be applied to a route to a destination dynamically changing since the corresponding photo data of the route to the destination cannot be previously edited.

(3) In the current navigation device, a display color is changed depending on turning on or off of an in-vehicle lighting device (e.g., head light). Therefore, when the photograph data is used in the above embodiment, a color editing procedure can be prepared for two types of the turning-on and turning-off.

(4) In the above embodiment, it is supposed that only a single piece of the photograph data exists with respect to a single area. Likewise the map data, multiple levels of the photograph data can be prepared for the corresponding single area. For instance, a first level of the photograph data of a low resolution can be prepared for a wide area map, while a second level of a high resolution can be prepared for a detail map in a town. In a town, roads or the like are intricate, so that the respective roads cannot be easily recognized without the high resolution. Consequently, it is assumed that, in towns, a detail map display is required. As a result, it is preferable that, in towns, photograph data with a relatively high resolution is prepared to be properly applied to the detail map display.

(5) The above embodiment can be executed by a program that is stored in a computer-readable medium such as a flexible disk, an optical magnetic disk, a CD-ROM, a hard disk, a ROM, a RAM. This program can be loaded and activated in a computer when needed. Further, the program can be loaded via a network and activated in the computer.

It will be obvious to those skilled in the art that various changes may be made in the above-described embodiments of the present invention. However, the scope of the present invention should be determined by the following claims.

What is claimed is:

1. An electronic device for displaying a map, the electronic device comprising:
    a map data storing unit that stores map data, the map data including road data and facility data;
    a photograph data storing unit that stores, as data to be displayed, photograph data photographing an earth surface;
    a display controlling unit that causes a display unit to display photograph data of a display target region based on the photograph data read from the photograph data storing unit; and
    a changing portion determining unit that determines, within the photograph data of the display target region, a data portion whose display attribute is to be changed based on the map data stored in the map data storing unit, wherein the data portion is dot portions of the photograph data corresponding to the road data or the facility data of the map data,
    wherein the display controlling unit causes the display unit to display the photograph data after the display controlling unit changes the display attribute of the data portion determined by the changing portion determining unit, to another data different from the data to be displayed.

2. The electronic device of claim 1,
    wherein the attribute includes at least a display color.

3. The electronic device of claim 2,
    wherein the display color is changed while resultant color tones in dots corresponding to the data portion determined by the changing portion determining unit are adjusted based on the photograph data.

4. The electronic device of claim 1,
    wherein the electronic device is a navigation device in a vehicle, for guiding a driver using the photograph data displayed by the display unit.

5. An electronic device for displaying a map, the electronic device comprising:
    a photograph data storing unit that stores photograph data whose display attribute is changed to modified data by being determined based on map data, wherein the map data corresponds to a data portion whose display attribute is changed, wherein the photograph data is formed by photographing an earth surface; and
    a display control unit that causes a display unit to display a display target region based on the photograph data read from the photograph data storing unit,
    wherein the attribute includes at least a display color,
    wherein the display color is changed while resultant color tones in dots corresponding to the data portion determined by the changing portion determining unit are adjusted based on the photograph data.

6. The electronic device of claim 1, wherein
    the changing portion determining unit determines the data portion whose display attribute is to be changed alternatively based on guiding router data obtained by using the map data stored in the map data storing unit.

7. An electronic device for displaying a map, the electronic device comprising:

a map data storing unit that stores map data, the map data including road data and facility data;

a photograph data storing unit that stores, as data to be displayed, photograph data photographing an earth surface;

a display controlling unit that causes a display unit to display photograph data of a display target region based on the photograph data read from the photograph data storing unit;

a target item determining unit that determines, within the photograph data of the display target region, a target data portion corresponding to a target item based on the map data stored in the map data storing unit, wherein the data portion is dot portions of the photograph data corresponding to the road data or the facility data of the map data; and an in-photo target item emphasizing unit for changing the content of the displayed photograph data to emphasize the target item by changing a display attribute of the target data portion corresponding to the target item, to amended data from the data to be displayed, wherein the display unit is caused to display the photograph data with the display attribute of the target data portion changed and emphasized within the displayed photograph data.

8. The electronic device of claim 5, wherein the electronic device includes a navigation device.

9. The electronic device of claim 7, wherein the target item, determining unit determines, within the photograph data of the display target region, the target data portion corresponding to the target item based on guiding route data obtained by using the map data stored in the map data storing unit.

10. An electronic device for displaying a map, the electronic device comprising:

a map data storing unit that stores map data;

a photograph data storing unit that stores, as data to be displayed, photograph data photographing no earth surface;

a display controlling unit that causes a display unit to display photograph data of a target region;

a target portion determining unit that determines a portion of the displayed photograph data, which corresponds to a certain road, by using the map data; and a photograph editing unit that changes a display attribute of the portion of the displayed photograph data determined by the target portion determining unit to another data from the data to be displayed, wherein the display controlling unit causes the display unit to display the photograph data of the target region with the display attribute changed by the photograph editing unit.

11. The electronic device of claim 10, wherein the certain road is a guiding route calculated based on the map data.

12. The electronic device of claim 7, wherein the display attribute is a display color, and wherein the display unit is caused to display the photograph data with the color of the target data portion changed and emphasized within the displayed photograph data.

13. The electronic device of claim 7, wherein the target item is a road, and wherein the display unit is caused to display the photograph data with the display attribute of the target data portion corresponding to the road being changed and emphasized within the displayed photograph data.

* * * * *